United States Patent
Weed et al.

(10) Patent No.: US 6,909,956 B2
(45) Date of Patent: Jun. 21, 2005

(54) METHOD AND APPARATUS FOR STOPPING AND PARKING A COMMERCIAL VEHICLE

(75) Inventors: Thomas J. Weed, Norton, OH (US); Kenneth A. Grolle, Elyria, OH (US); Joseph M. Macnamara, Ashland, OH (US); Kirit A. Thakkar, Parma, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 10/218,246

(22) Filed: Aug. 14, 2002

(65) Prior Publication Data
US 2004/0034462 A1 Feb. 19, 2004

(51) Int. Cl.$^7$ .......................... G06F 19/00; G06F 7/70; G06G 7/00; G06G 7/76
(52) U.S. Cl. .............. 701/70; 701/1; 701/22; 701/29; 701/32; 701/33; 701/48; 701/70; 701/71; 701/74; 701/76; 180/197; 180/89.1; 180/27.1; 180/333; 340/425.5; 303/3; 303/20
(58) Field of Search .................. 701/33, 29, 22, 701/1, 70, 71, 76, 74, 48, 32, 36, 121; 180/197, 89.1, 271, 333, 65.3; 340/425.5, 438, 988; 280/727, 762, 73; 307/10.1; 303/3, 20

(56) References Cited

U.S. PATENT DOCUMENTS

| | | | |
|---|---|---|---|
| 3,657,720 A | 4/1972 | Avdenko et al. | |
| 3,944,972 A | 3/1976 | Chandler | |
| 4,080,537 A | 3/1978 | Bucher | |
| 4,227,588 A | 10/1980 | Biancardi | |
| 4,309,882 A | 1/1982 | Maiocco | |
| 4,344,138 A * | 8/1982 | Frasier | 701/70 |
| 4,652,057 A * | 3/1987 | Engle et al. | 303/3 |
| 5,719,551 A | 2/1998 | Flick | |
| 5,815,822 A | 9/1998 | Iu | |
| 5,890,080 A * | 3/1999 | Coverdill et al. | 701/29 |
| 6,273,771 B1 * | 8/2001 | Buckley et al. | 440/84 |
| 6,313,740 B1 | 11/2001 | Goetz | |
| 6,332,354 B1 * | 12/2001 | Lalor et al. | 73/121 |
| 6,421,593 B1 * | 7/2002 | Kempen et al. | 701/48 |

(Continued)

FOREIGN PATENT DOCUMENTS

| | | |
|---|---|---|
| DE | 19736915 A | 8/1997 |
| DE | 19846788 A | 10/1998 |
| WO | WO 99/65581 A | 12/1999 |
| WO | WO 99/65681 A | 12/1999 |

OTHER PUBLICATIONS

ABS/ATC System, Addendum 2002, Internet, pp. 1–5.*
ukcar.com, UK car ABS anti lock braking, 1979, Internet, pp. 1–2.*
Meritor Wabco, Electronically controlled air suspension (ECAS) for trucks, 1999, Internet, pp. 1–20.*
Cho et al., Design and implementation of HILS system for ABS ECU of commercial vehicles, 2001, IEEE, pp 1272–1277.*

*Primary Examiner*—Thomas G. Black
*Assistant Examiner*—McDieunel Marc
(74) *Attorney, Agent, or Firm*—Calfee, Halter & Griswold, LLP

(57) ABSTRACT

A receiver capable of receiving a remote vehicle stop request signal is mounted to a commercial vehicle and connected to the vehicle antilock braking ECU by a vehicle communication bus. The receiver may also be capable of transmitting a signal, thereby allowing the desired vehicle to be isolated. Furthermore, a user input device may be mounted to the vehicle that allows manual input of a park signal. When the park signal has been received by the vehicle ECU, the vehicle braking system is employed, thereby preventing the movement of the vehicle.

38 Claims, 6 Drawing Sheets

U.S. PATENT DOCUMENTS

| | | | |
|---|---|---|---|
| 6,577,942 B1 * | 6/2003 | Moore | 701/76 |
| 6,735,506 B2 * | 5/2004 | Breed et al. | 701/36 |
| 2001/0038239 A1 | 11/2001 | Ehrlich et al. | |
| 2001/0056544 A1 | 12/2001 | Walker | |
| 2003/0006886 A1 * | 1/2003 | Gabbard | 340/425.5 |
| 2003/0009270 A1 * | 1/2003 | Breed | 701/29 |
| 2003/0085819 A1 * | 5/2003 | Gustavsson et al. | 340/988 |
| 2003/0158635 A1 * | 8/2003 | Pillar et al. | 701/1 |
| 2003/0158638 A1 * | 8/2003 | Yakes et al. | 701/22 |
| 2003/0158640 A1 * | 8/2003 | Pillar et al. | 701/33 |
| 2003/0195668 A1 * | 10/2003 | Radtke et al. | 701/1 |
| 2003/0195676 A1 * | 10/2003 | Kelly et al. | 701/29 |
| 2003/0209893 A1 * | 11/2003 | Breed et al. | 280/735 |
| 2003/0212480 A1 * | 11/2003 | Lutter et al. | 701/33 |
| 2004/0002794 A1 * | 1/2004 | Pillar et al. | 701/1 |

\* cited by examiner

START/PARK METHOD

REMOTE STOP

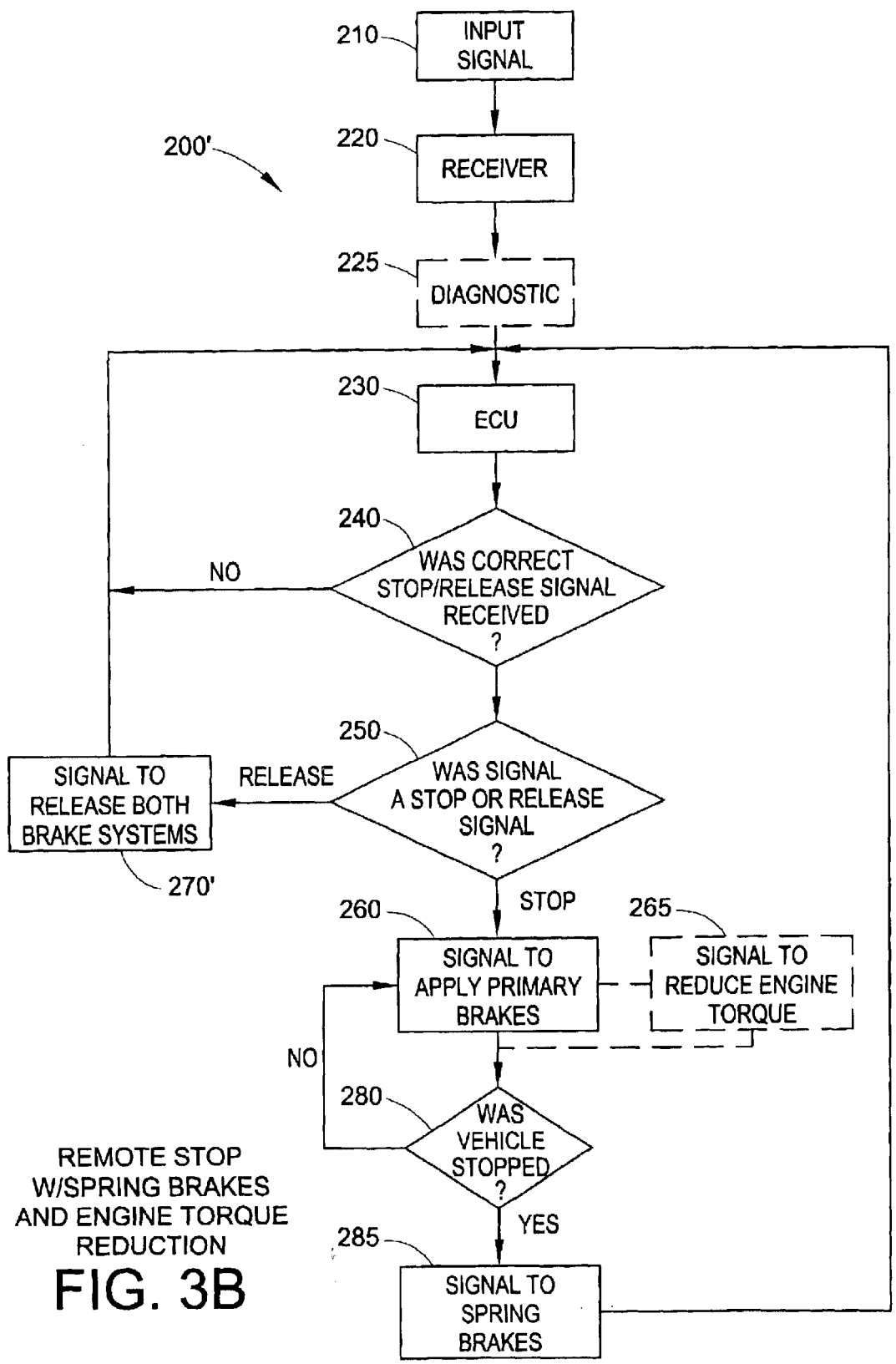

REMOTE STOP W/RESET TIMER

COMBINE PARK/RELEASE
AND REMOTE STOP METHOD

METHOD AND APPARATUS FOR STOPPING AND PARKING A COMMERCIAL VEHICLE

BACKGROUND OF THE INVENTION

This invention relates to a method and apparatus for securing a vehicle, and more specifically to a method and apparatus for stopping and parking a commercial vehicle.

Theft of commercial vehicles, especially those hauling hazardous or flammable materials, is becoming a major issue of concern throughout the world. Vehicles hauling such materials can be stolen or hijacked and used to cause mass destruction. Additionally, a commercial vehicle may need to be stopped for reasons other than suspected terrorism. This may include any potential reason where the continued path of the vehicle may create a potentially dangerous situation.

Currently, there is no known method of stopping a commercial vehicle remotely without the use of an external force. In many situations, an external force that is employed to stop a commercial vehicle, including blowing out tires, blocking the path of the vehicle, and ramming the vehicle, can be extremely dangerous and lead to deadly outcomes. Accordingly, a need exists for remotely stopping a commercial vehicle in a controlled and safe manner.

Additionally, a need exists to provide further security to parked commercial vehicles, especially those that may cause destruction prior to being able to be stopped by a remote system.

BRIEF SUMMARY OF THE INVENTION

A method and apparatus for securing a vehicle from theft or hijacking is provided. One aspect of the present invention is a method and apparatus for stopping or parking a vehicle by sending a secured signal to the vehicle antilock braking electronic control unit of "ECU". In one embodiment, a receiver is used to receive a remote vehicle stop request signal. The receiver can be connected to the vehicle antilock braking ECU by a vehicle communication bus. In another embodiment, a operator input device is used to generate a vehicle park signal. The operator input device can be connected to the vehicle antilock braking ECU by a vehicle communication bus.

Another aspect of the present invention is a method and apparatus for stopping a specific vehicle. In one embodiment, a transceiver is used to remotely receive a signal from a remote user. The transceiver can then be used to send a vehicle identifier signal to the remote user, thereby allowing isolation of a vehicle stop request signal.

BRIEF DESCRIPTION OF THE DRAWINGS

FIG. 3B is a flow diagram illustrating the stop/release method illustrated in FIG. 3A, and incorporating a spring brake activation sequence and optional engine torque reduction sequence.

DETAILED DESCRIPTION

Figure 1:
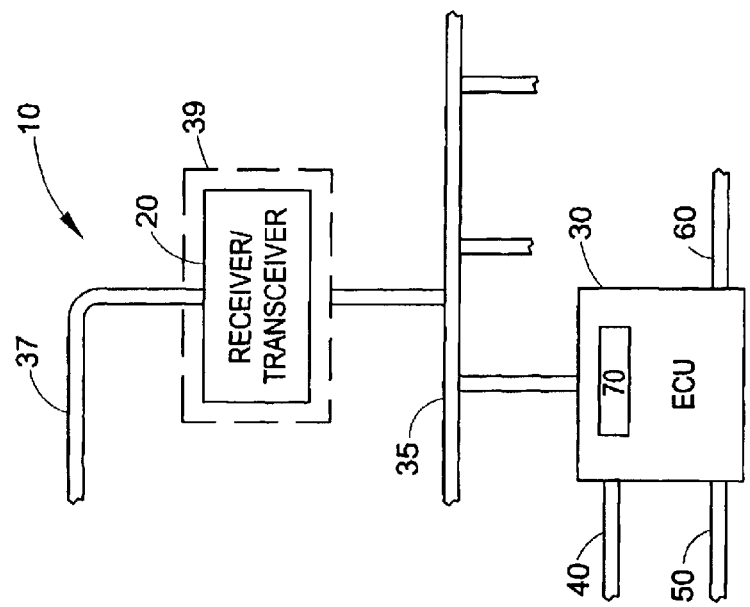
FIG. 1 is a schematic of a system for stopping a vehicle.

A system for stopping and parking a vehicle, generally referenced as 10 in FIG. 1, includes an apparatus 20 for receiving a signal, either from within the cab of a commercial vehicle or from a remote source, and sending such signal to the ECU 30 used for the antilock braking/traction control system. The apparatus 20 may be any type of circuit such as, for example, a receiver that is capable of receiving a wireless signal, including radio frequency, infrared, or optical signals or satellite transmissions sent from a remote location. The signal received by the apparatus 20 may be encoded or encrypted to ensure only authorized signals are processed by the system 10. Additionally, as will be discussed in greater detail below, the apparatus 20 may also be capable of transmitting a signal back to the source of the received signal. The apparatus 20 may receive a remote signal or the signal may be input from a plug-in device, or even manually triggered by the operation of a button or switch. The plug-in device and manual trigger would be especially useful in the parking functions of this invention discussed below.

The apparatus 20 may be located on the trailer, on the tractor, in the tractor cab, or any combination thereof. Since the apparatus 20 may transmit a signal to the antilock braking system ECU 30 along conventional communications busses 35, the only requirement regarding the location of the apparatus 20 is it must be capable of receiving power and a ground 37. However, since virtually every location on a truck or trailer is capable of receiving power and a ground wiring 37, the apparatus 20 may be placed in a variety of locations. For example, if it is desirable to place the apparatus 20 on the truck trailer, power may be received from the Power Line Carrier (PLC) thereby minimizing the harnessing needs of the system 10. The apparatus 20 may communicate along a number of existing vehicle busses 35, including J2497 (PLC), J1939 (CAN), J1587 (Diagnostic) or IEEE 1394.

The location of the apparatus 20 may depend on the desired functionality. For example, if the apparatus 20 is employed to maintain the vehicle in the parked position, the apparatus 20 may be a located within the truck cabin. The location of the apparatus 20 within the cabin may also be useful to prevent truck-jackings. In other circumstances, it may be desirable to place the apparatus 20 on the trailer, thereby ensuring that the apparatus 20 stays with the dangerous material when the trailer switches cabs. Under these circumstances, only certain trailers, i.e. those carrying hazardous materials or would otherwise warrant additional security, would need to be equipped with the apparatus 20. Additionally, if there is concern regarding the disablement of the system 10, the apparatus 20 may be located in a secure area 39, such as a encasement under lock and key or a permanent enclosure. In such cases, it is only important that the apparatus 20 be capable of receiving a signal. Furthermore, if desirable, more than one apparatus 20 may be placed on the vehicle.

Upon receiving a signal, the apparatus 20 may send a signal over one or more of the vehicle communication busses 35 to the antilock braking/traction control ECU 30. Although it would be preferred to use existing vehicle communication busses, one skilled in the art should appreciate that additional wiring and harnessing may be provided to maintain a separate communication bus for this invention. Furthermore, the signal from the apparatus 20 to the ECU 30 may also be sent by an appropriate wireless means. The signal received by the ECU 30 is processed and a signal 40 is sent to apply the primary brakes. If desirable, the different signals may be sent to the apparatus 20, and then to the ECU 30, to provide different brake pressures. For example, a first signal may be made to apply the brakes in moderation and thereby slowly stop the vehicle. However, if the situation warrants a quicker stop of the vehicle, a second signal may be made to apply full brake pressure to the vehicle. Regardless of the amount of brake pressure applied, the antilock braking and traction control system should be operable during the entire braking event to allow for continued control of the vehicle. Optionally, the ECU 30 may also send a signal 50 to the vehicle engine commanding minimal engine torque. The minimal engine torque signal will prevent the driver of the vehicle from attempting to override the vehicle braking system by increasing the power to the engine. Additionally, the ECU may cooperate with an engine retarder or an engine kill switch. Optionally, if the vehicle is parked or has come to a stop, the ECU 30 may send a signal 60 to drain the air brake system reservoir pressure, thereby apply the vehicle's spring brakes. Preferably, once the signal is received by the ECU 30 from the apparatus 20, the stop/park command is stored in the vehicle's non-volatile memory 70, thereby preventing the operator from erasing the command merely by turning the vehicle off and back on.

Figure 2:
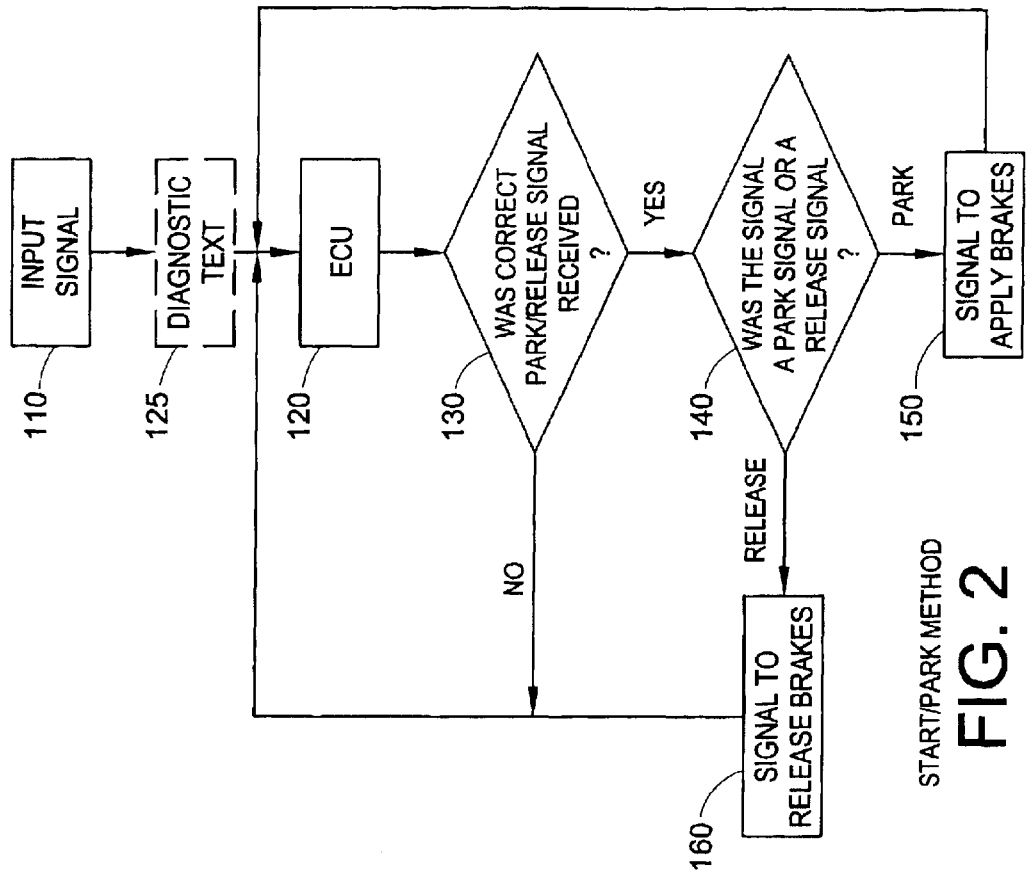
FIG. 2 is a flow diagram illustrating a park/release method.

FIG. 2 illustrates a flow chart of a method of parking a commercial vehicle, generally referenced as 100. The method 100 begins with the operator providing an input signal 110. As mentioned above, the input signal 110 may be generated by a plug-in device or by the depression of a button or switch. Preferably the input signal 110 is either a plug-in device that acts as a key, a plug-in device with a set code that allows the generation of the signal 110, a button or set of buttons with a set code that allows generation of the signal 110, or a button that is hidden from view or under lock and key. Once the signal 110 is generated, it is transmitted to the vehicle ECU 120 for processing. Optionally in step 125, the system may undergo diagnostic testing to determine whether or not the signal 110 may be generated and received by the ECU 120. If the diagnostic testing sequence 125 is used, a failure to detect the ability to receive a signal 110 may be used to initiate a park sequence, thereby rendering the vehicle inoperable.

The ECU 120 then determines at step 130 whether a correct park/release signal has been received. If the correct park/release signal was not received, the process loops back around and looks for another signal from the operator. If the correct park/release signal has been received from the operator, the ECU then determines in step 140 whether the signal was a park or release signal. The park signal may be the same or different from the release signal. If the signals are the same, the ECU may retrieve the last signal received and designate the new signal as the opposite. If the ECU determines that a park signal has been received, the ECU sends a signal at step 150 to apply the vehicle brakes. The signal generated in step 150 may either go towards applying the primary brakes, wherein air pressure is maintained within the air brake lines, or towards applying the vehicle spring brakes, wherein the pressure is released from the air supply reservoirs. The method then loops back around and looks for another signal from the operator. If the ECU determines that a release signal has been received, the ECU sends a signal at step 160 to release the brakes, either the primary brakes or the spring brakes. The method then loops back around and looks for another signal from the operator.

FIGS. 3A–3D illustrate the remote stop method, generally referenced as 200. In the embodiment illustrated in FIG. 3A, a remote sender transmits a remote signal 210 that is received by receiver 220. Optionally, diagnostic testing may be provided at step 225. As with the park/release method 100, if the diagnostic testing sequence 225 is used, the failure to detect the receiver 220 may be used to initiate a park sequence if the vehicle is parked, or a stop sequence if the vehicle is moving.

The signal from the receiver 220 is then sent to the vehicle ECU in step 230 which then processes the signal to determine whether a correct stop/release signal was received at step 240. If an incorrect signal has been received, the method loops back and looks for another signal 210 from the remote user. If a correct stop/release signal was received, the ECU processes to the signal at step 250 to determine whether the signal was a stop signal or a brake release signal. As with the park/release method 100, the stop signal may be the same or different from the brake release signal. If a stop signal has been received, the ECU sends a signal at step 260 to apply the primary brakes, and then the method loops back around to look for another signal 210. If a brake release signal has been received, the ECU sends a signal at step 270 to release the primary brakes, and then the method loops back around to look for another signal 210.

FIG. 3B illustrates a remote stop method 200', which incorporates a spring brake activation sequence and optional engine torque reduction sequence. As the ECU sends a signal to apply the primary brakes in step 260, the ECU may also send a signal at step 265 to the engine to reduce the available torque. This prevents the vehicle driver from attempting to override the brake system by throttling the engine. The ECU then determines at step 280 whether or not the vehicle has come to a stop. If the vehicle has not stopped, the primary brakes continue to stop the vehicle. If the vehicle has stopped, the ECU sends a signal at step 285 to deplete the air supply reservoirs and thereby engage the spring breaks. Additionally, at step 270' the brake release signal must be directed to both the primary and secondary brake systems.

Figure 3A:
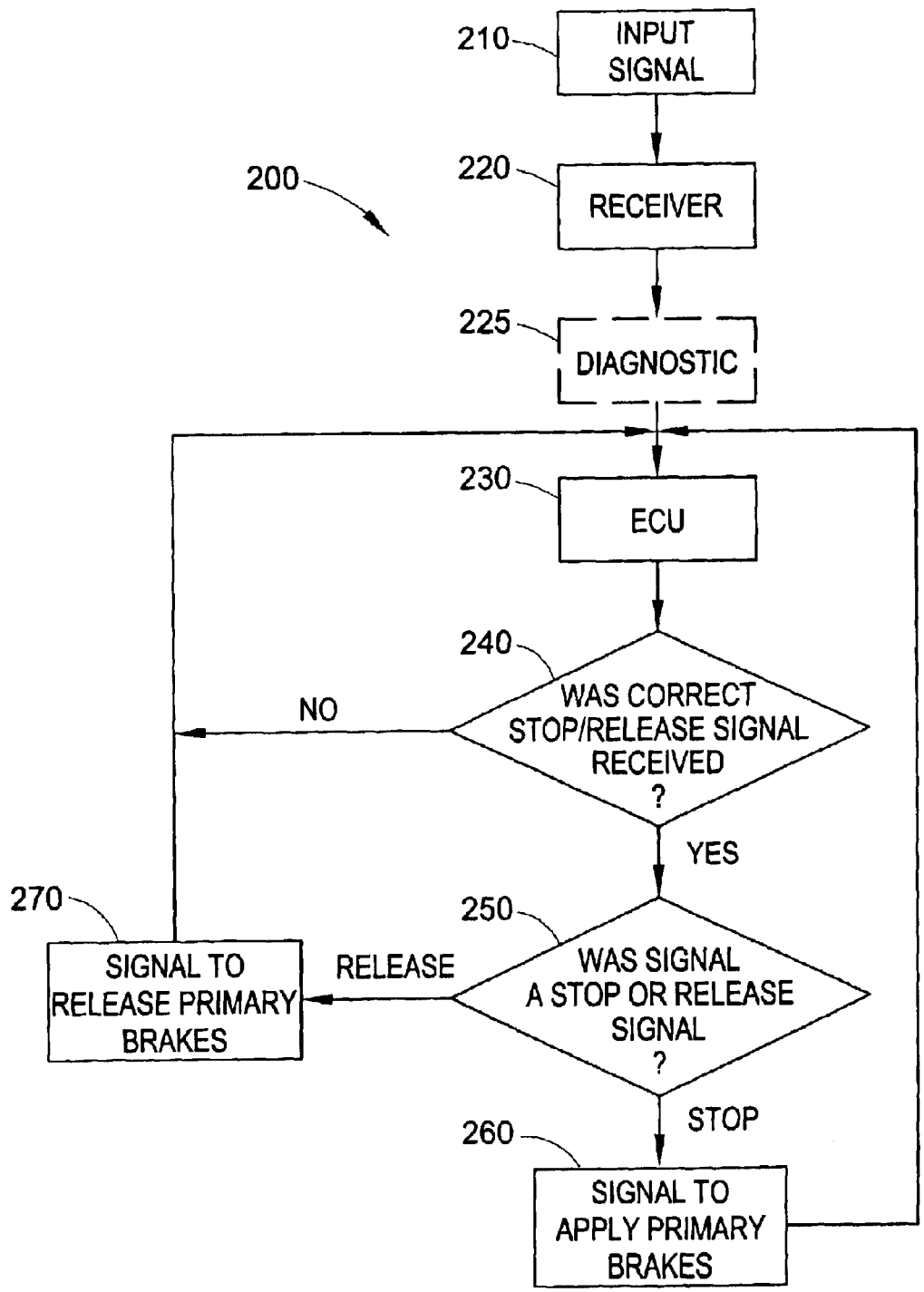
FIG. 3A is a flow diagram illustrating a stop/release method.
Figure 3C:
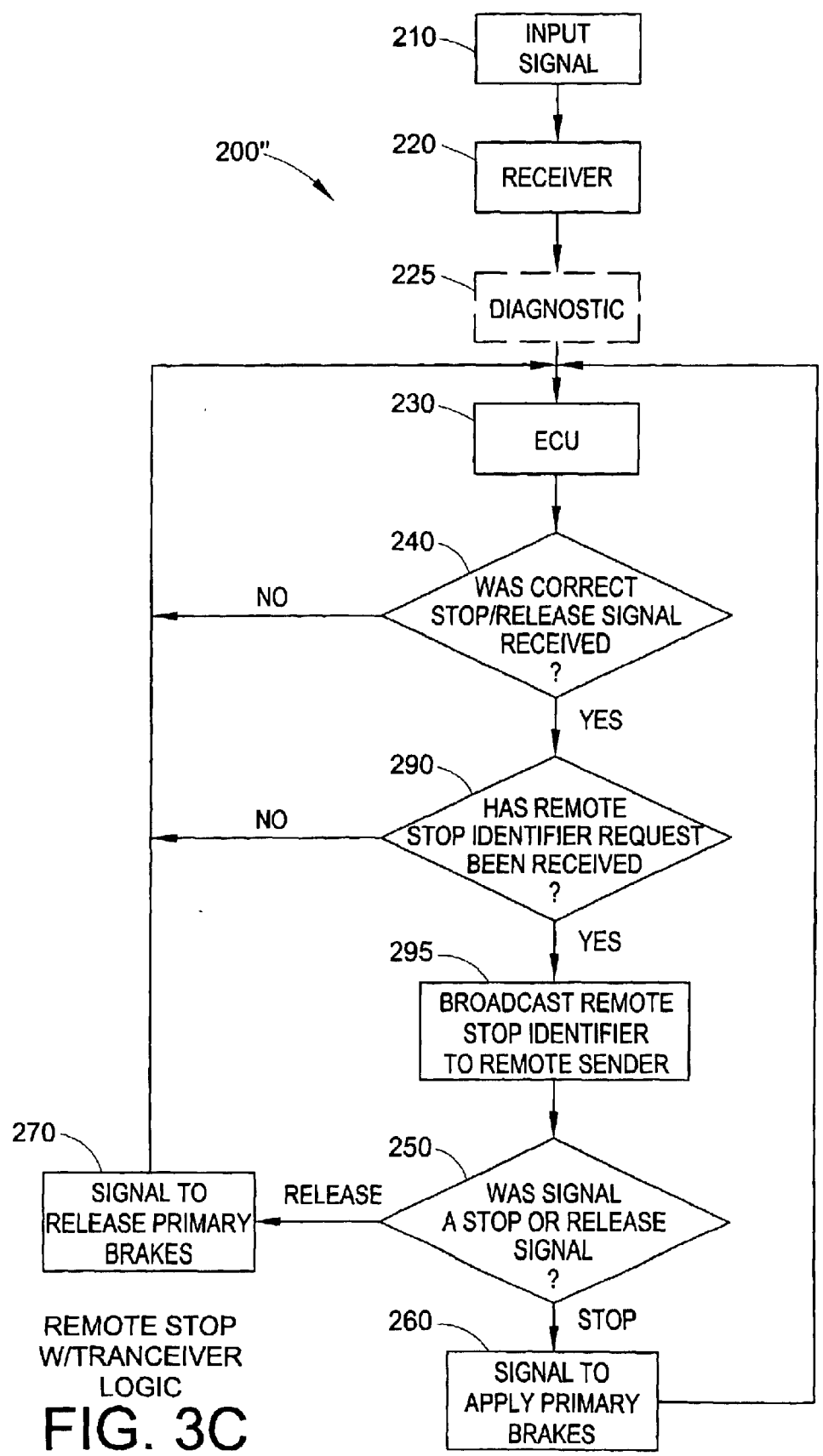
FIG. 3C is a flow diagram illustrating the stop/release method illustrated in FIG. 3A, and incorporating transceiver logic.

FIG. 3C illustrates a remote stop method 200", which incorporates transceiver logic. In this method 200", after the ECU verifies that a correct remote signal 210 has been received, the ECU determines, at step 290, whether a remote stop identifier request signal has been received. The remote stop identifier request signal is used to verify that only the intended vehicle receives a stop signal. This may be important when there are multiple vehicles with remote stop systems in a close proximity. If the remote stop identifier request signal has not be received, then method loops back and looks for another signal 210 from the remote user. If the remote stop identifier request signal has been received, then transceiver 220' broadcasts a remote stop identifier signal at step 295 to the remote sender. By receiving this information from the system, the remote user will be able to send a signal only to the vehicle which the remote user intends to stop.

Figure 3D:
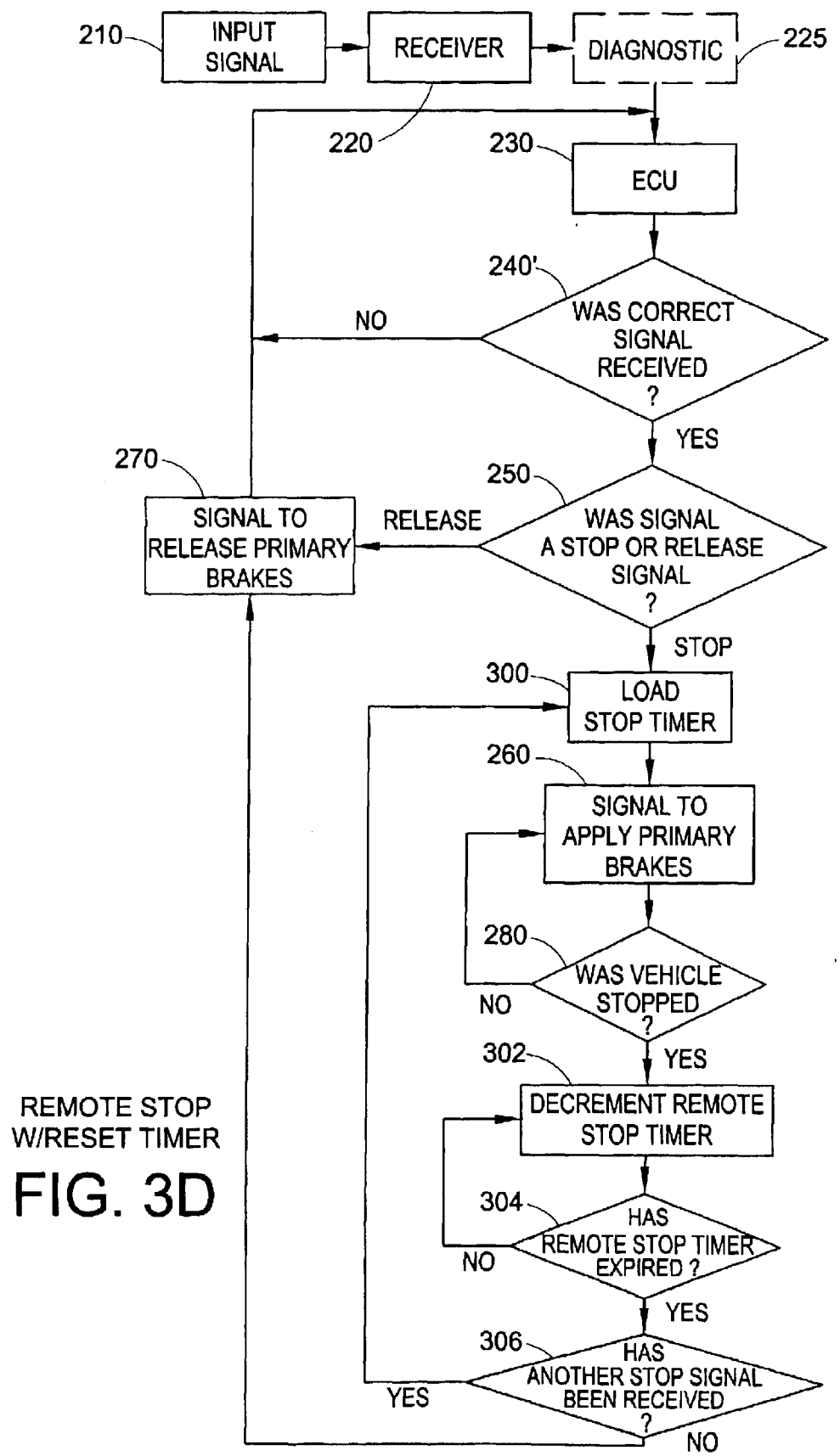
FIG. 3D is a flow diagram illustrating the stop/release method illustrated in FIG. 3A, and incorporating a reset timer sequence.

FIG. 3D illustrates a remote stop method 200''', incorporating a reset timer sequence. After the ECU determines that a stop signal has been received at step 250, the ECU loads a stop timer at step 300. The ECU then sends the signal at step 260 to the primary brakes which are applied until the vehicle comes to a stop by cycling about step 280. Once the vehicle has come to a stop, the ECU begins to decrement the remote timer at step 302. In step 304, the ECU then determines whether the timer has expired, and if it has not, the timer continues to decrement. Once the timer has expired, the ECU determines, at step 306, whether another stop signal has been received. If another stop signal has been received, the method 200''' loops back to loading the stop timer at step 300. If the ECU determines has not received another stop signal, the primary brakes are released at step 270 and the vehicle become operable. The reset timer sequence is employed in order to avoid rendering non-intended vehicles from remaining inoperative after receiving a non-intended stop signal.

It should be noted that the embodiments illustrated in FIGS. 3A–3D may be used in any combination to establish a desired remote stop method. An additional feature that may be encompassed into any of the remote stop methods, is the storing the remote stop signal in the non-volatile memory of the ECU in order to prevent resetting the method by restarting the vehicle.

Figure 4:
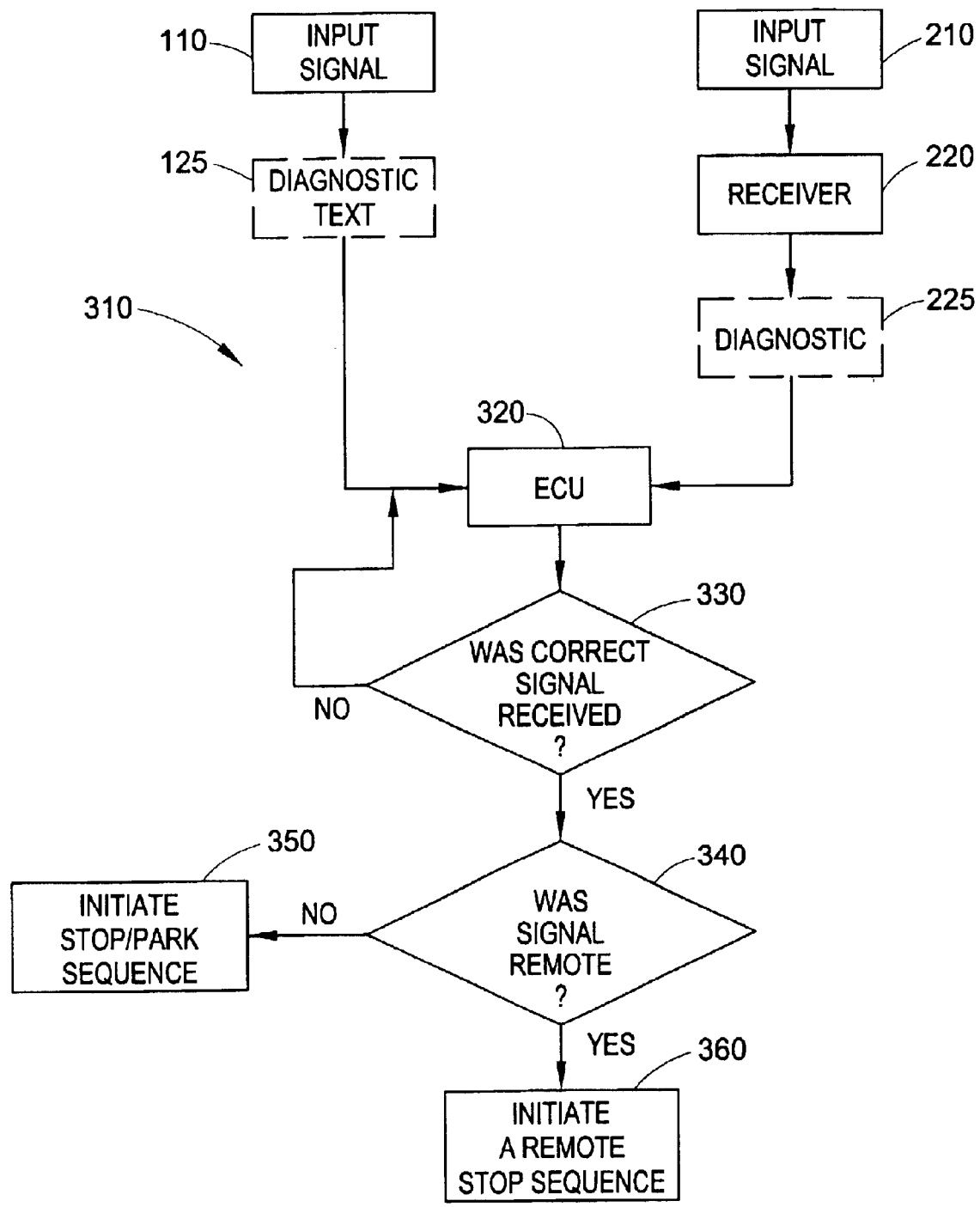
FIG. 4 is a flow diagram illustrating a combine park/release and stop/release method.

FIG. 4 illustrates a method 310 that combines the park/release and remote stop methods. A signal is generated either by an operator in step 110 or by a remote user in step 210. The signal generated by the operator is step 110 may pass through an optional diagnostic sequence at step 125 and then to the ECU 320. A signal generated by a remote user in step 210 is received by receiver 220, processed through an optional diagnostic sequence at step 225, and then sent to the ECU 320. In step 330, the ECU then determines whether the signal was authorized before processing the signal at step 340 as an operator signal, wherein a park/release sequence is initiated in step 350, or a remote signal, wherein a stop/release sequence is initiated in step 360.

It will be appreciated that apparatus for receiving and commencing a stop/park sequence may adopt a wide variety of designs or configurations. Furthermore, one skilled in the art should appreciate that this invention may be a new apparatus, or may be adapted to retrofit existing vehicle equipment. Additionally, it should be understood that the methods illustrated in this application as merely illustrative examples of the invention and should not be constrained to the sequence or specific steps herein. As such, this invention is intended to include such modifications and alterations in so far as they fall within the scope of the appended claims or the equivalents thereof.

What is claimed is:

1. A method for stopping a vehicle comprising the steps of:
   sending a signal requesting the vehicle to stop via an apparatus remote from the vehicle brake actuating device;
   processing the signal within the vehicle antilock braking ECU;
   sending a vehicle stop request signal to the vehicle brake system to apply the brakes;
   applying the vehicle brake system to stop the vehicle; and
   running diagnostic tests, wherein said diagnostic tests determine whether a vehicle stop request signal can be received.

2. The method of claim 1 further comprising the step of receiving the vehicle stop request signal with a receiver.

3. The method of claim 2, wherein said receiver is mounted on a vehicle trailer.

4. The method of claim 1 further comprising the step of communicating the vehicle stop request signal to the vehicle antilock braking ECU via an existing vehicle communication bus.

5. The method of claim 4, wherein said vehicle communication bus is the vehicle Power Line Carrier.

6. The method of claim 1, wherein the vehicle stop request signal is generated manually.

7. The method of claim 6, wherein the vehicle stop request signal is generated from within the vehicle cabin.

8. The method of claim 1, further comprising the step of encoding said vehicle stop request signal.

9. The method of claim 1, further comprising the steps of:
   sending a brake release signal; and
   releasing the vehicle brake system.

10. The method of claim 1 further comprising the step of generating a vehicle stop request signal when any one of said diagnostic tests determines that a vehicle stop request signal cannot be received.

11. The method of claim 1, wherein said diagnostic tests are performed prior to the release of the vehicle parking brakes.

12. The method of claim 11 further comprising the step of maintaining the vehicle parking brakes when any one of said diagnostic tests determines that a vehicle stop request signal cannot be received.

13. The method of claim 1 further comprising the step of applying the vehicle parking brakes once the vehicle has come to a stop.

14. The method of claim 1, wherein the vehicle is a commercial vehicle.

15. The method of claim 1 further comprising the steps of:
   loading a stop timer once a vehicle stop request signal has been received;
   decrementing the stop time once the vehicle has come to a stop;
   determining whether another vehicle stop request signal has been received; and
   releasing the vehicle brake system if the stop time has expired and another vehicle stop request signal has not been received.

16. A method for stopping a vehicle comprising the steps of:
   sending a signal requesting the vehicle to stop via an apparatus remote from the vehicle brake actuating device;
   processing the signal within the vehicle antilock braking ECU;
   sending a signal to the vehicle brake system to apply the brakes;
   applying the vehicle brake system to stop the vehicle;
   sending an engine torque reduction signal after a vehicle stop request signal has been received; and
   reducing the vehicle engine torque.

17. The method of claim 16 further comprising the steps of
   processing the vehicle stop request signal only upon receipt of a vehicle stop identifier request signal.
   processing the vehicle stop request signal only upon receipt of a vehicle stop identifier request signal; and
   broadcasting a vehicle identifier signal when a vehicle stop identifier signal has been received.

18. The method of claim 16 further comprising the step of receiving the vehicle stop request signal with a receiver.

19. The method of claim 16, wherein said receiver is mounted on a vehicle trailer.

20. The method of claim 16 further comprising the step of communicating the vehicle stop request signal to the vehicle antilock braking ECU via an existing vehicle communication bus.

21. The method of claim 20, wherein said vehicle communication bus is the vehicle Power Line Carrier.

22. The method of claim 16, wherein the vehicle stop request signal is generated manually.

23. The method of claim 22, wherein the vehicle stop request signal is generated from within the vehicle cabin.

24. The method of claim 16 further comprising the step of encoding said vehicle stop request signal.

25. The method of claim 16 further comprising the steps of:
- sending a brake release signal; and
- releasing the vehicle brake system.

26. The method of claim 16 further comprising the step of applying the vehicle parking brakes once the vehicle has come to a stop.

27. The method of claim 16, wherein the vehicle is a commercial vehicle.

28. A method for stopping a vehicle comprising the steps of:
- sending a signal requesting the vehicle to stop via an apparatus remote from the vehicle brake actuating device;
- processing the signal within the vehicle antilock braking ECU;
- sending a signal to the vehicle brake system to apply the brakes;
- applying the vehicle brake system to stop the vehicle;
- loading a stop timer once a vehicle stop request signal has been received;
- decrementing the stop time once the vehicle has come to a stop;
- determining whether another vehicle stop request signal has been received; and
- releasing the vehicle brake system if the stop time has expired and another vehicle stop request signal has not been received.

29. The method of claim 28, wherein the vehicle is a commercial vehicle.

30. The method of claim 28, further comprising the step of encoding said vehicle stop request signal.

31. The method of claim 28, further comprising the steps of:
- sending a brake release signal; and
- releasing the vehicle brake system.

32. A vehicle stop mechanism comprising:
- a means for receiving a signal from an apparatus remote from the vehicle brake actuating device requesting the vehicle to stop;
- a means for processing the signal within a vehicle antilock braking ECU;
- a vehicle brake system;
- a means for sending a vehicle stop request signal to the vehicle brake system; and
- a means for running diagnostic tests, wherein said diagnostic tests determine whether a vehicle stop request signal can be received.

33. A vehicle stop mechanism comprising:
- a means for receiving a signal from an apparatus remote from the vehicle brake actuating device requesting the vehicle to stop;
- a vehicle brake system;
- a means for processing the signal within a vehicle antilock braking ECU and a means for sending said signal to said vehicle brake system;
- a means for sending an engine torque reduction signal after a vehicle stop request signal has been received; and
- a means for reducing the vehicle engine torque.

34. The vehicle stop mechanism of claim 33, wherein said a means for receiving a signal from an apparatus remote from the vehicle brake actuating device requesting the vehicle to stop is a receiver.

35. The vehicle stop mechanism of claim 34, wherein said receiver is located on a vehicle trailer.

36. The vehicle stop mechanism of claim 35, wherein said receiver is located in a secure location on the vehicle trailer.

37. The vehicle stop mechanism of claim 33, further comprising a means for encoding said vehicle stop request signal.

38. The vehicle stop mechanism of claim 33, further comprising a means for sending a brake release signal.

* * * * *